Sept. 4, 1951 W. ODENTHAL 2,566,674
TURNTABLE AS USED FOR DISPLAY PURPOSES AND FRICTION
DRIVE MECHANISM THEREFOR
Filed Dec. 24, 1948

INVENTOR.
William Odenthal
BY
ATTORNEY

Patented Sept. 4, 1951

2,566,674

UNITED STATES PATENT OFFICE 2,566,674

TURNTABLE AS USED FOR DISPLAY PURPOSES AND FRICTION DRIVE MECHANISM THEREFOR

William Odenthal, Los Angeles, Calif.

Application December 24, 1948, Serial No. 67,222

2 Claims. (Cl. 74—206)

This invention relates to turntables as used for display or other purposes and more particularly pertains to an improved friction driving mechanism for such turntables.

One of the purposes of this invention is to provide a friction drive mechanism which is an improvement over and superior to drive mechanisms for turntables heretofore used, in point of its comparative simplicity, compactness, strength, durability and safe and reliable operation over long periods of use without requiring frequent servicing and replacement of parts as well as in consideration of the ease with which it may be installed, assembled and disassembled along with the turntable driven thereby.

The invention relates to friction drives of the kind having the entire drive mechanism including the electric motor mounted on a supporting member which is pivoted on a suitable base for movement about a vertical axis and springurged so that a friction drive roller or puck as a part of said mechanism, is yieldably held against the track for driving the turntable so that the roller will slip should the turntable become held or retarded against normal turning during the operation of the motor.

A further purpose is to provide a drive mechanism of the kind described in which the pivoted motor-supporting member and driving roller are positively held against any vertical or angular movement out of fixed horizontal planes, thereby preventing the roller, which tends to move up or down due to irregularities of the track and possible inclination of the turntable from a horizontal plane, from moving in this erratic manner or possibly contacting the underside of the turntable, with the consequences in either case of imposing an objectionable load on or damaging the motor and associated parts as well as the pivotal mounting for the supporting member.

A further important provision and object of the invention is to provide a circular turntable having a base of similar size and contour so that when the driving mechanism for rotating the turntable is mounted on the base between it and the turntable proper the entire assembly may be turned on edge and moved about simply by using the turntable top and base as wheels.

Figure 1:
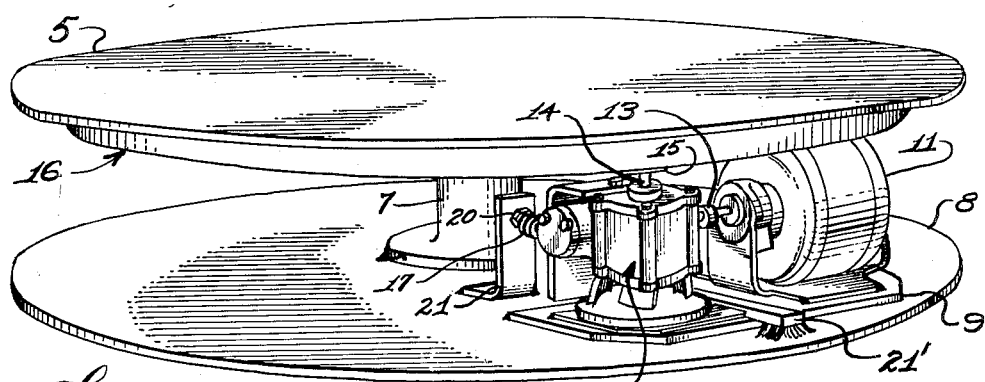
Figure 2:
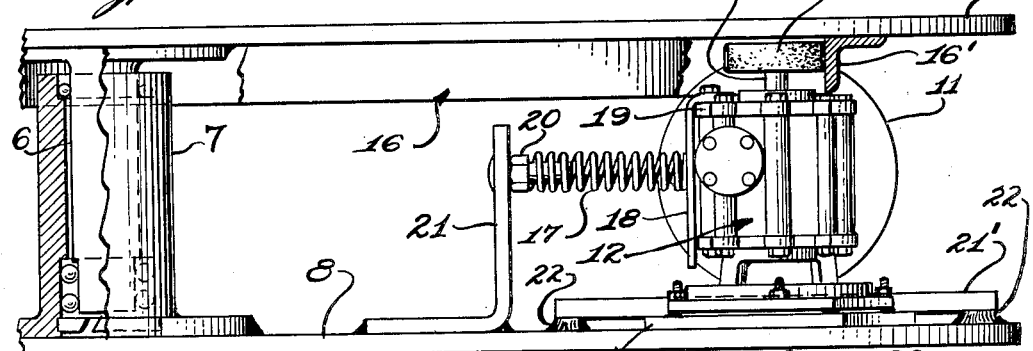
Figure 3:
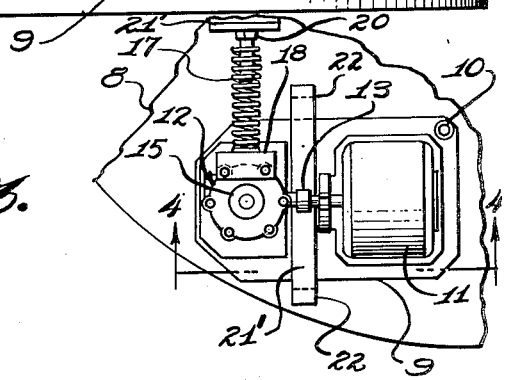
Figure 4:
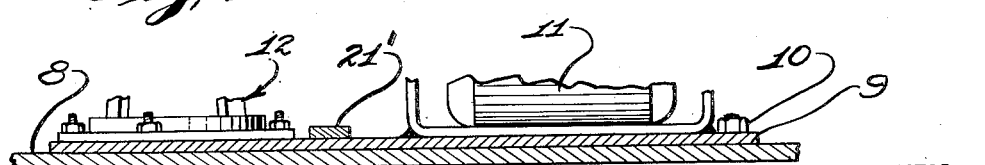

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a perspective view of a drive mechanism for a turntable, embodying the present invention, Fig. 2 is an enlarged fragmentary part elevation and part sectional view of the drive mechanism, Fig. 3 is a fragmentary top plan view of said mechanism, and Fig. 4 is a sectional view taken on the line 4—4 of Fig. 3.

Referring to the drawing more specifically 5 designates a circular turntable mounted to rotate on a central vertical axle 6 in bearing means 7 supported on a circular base 8, said base being concentric to the turntable proper and having the same diameter as the latter so that when the driving mechanism for rotating the turntable is mounted on the base between it and the turntable proper the entire assembly may be turned on edge and moved about simply by using the turntable top and base as wheels.

In accordance with this invention a platelike drive mechanism supporting member 9 is mounted on the base 8 so as to swing on a pivot 10 located adjacent one extremity of the supporting member and has fixed thereon a motor 11, a gear reduction mechanism 12 driven by motor shaft 13, a vertical shaft 14 journalled in and driven by the gear reduction mechanism, and a driving roller or puck 15 of resilient rubber or the like fixed on the upper end of said shaft so as to be rotated in a horizontal plane.

An endless circular track 16 is fixed in any suitable manner to the underside of the turntable 5 and has a vertically disposed annular band-like portion 16' which is contacted on its inner side by the drive roller 15 to frictionally drive the turntable proper.

As a means for yieldably holding the driving roller in frictional contact with the track portion 16' so that the turntable will be driven quietly and steadily and so that in case the turntable is retarded or held against rotation while the drive mechanism is in operation, the drive mechanism will not become damaged or deranged or the motor objectionally overloaded, I provide an expansion spring 17 for yieldably holding the drive roller 15 against the track with sufficient force to cause rotation of the turntable but so that the roller will slip should the load become too great. The yieldable mounting of the drive roller also enables it to drive the turntable notwithstanding that the bearings of the turntable or shaft of the drive roller run out of true because of wear. This spring is held under compression between a keeper member 18 on the gear reduction mechanism 19, and a keeper member 20 on a bracket 21 fixed on the base 8. With this arrangement when the turntable is stopped or retarded as above noted the spring will yield and allow the member 9 to rotate more fully without jamming or damaging the drive mechanism or motor. The spring 17 will return the drive roller to frictional driving contact with the track 16 when the turntable is released.

Means is provided to positively maintain the plate-like support 9 and the driving roller 15 in fixed horizontal planes while affording limited horizontal movement of the member 9 on the pivot 10. This is essential, as without such means, the roller 15 tends to ride up or down on the track due to possible irregularities thereof or to tilting of the turntable or the normal resultant forces of a frictional drive of this nature, and such irregular movement would place the pivot 10 under damaging strains and stresses and possibly result in the driving roller contacting the turntable proper and subjecting the motor and drive mechanism to damaging loads. Consequently the aforesaid means as here shown comprises a bar 21' welded or otherwise fixed at 22 at its ends to the base 8 in such position that it will overlie and contact the supporting member 9 adjacent the end of the latter farthest removed from the pivot 10, with the member 9 restrained to limited sliding or pivotal movement on a fixed horizontal plane. This arrangement places the strains and stresses developed by the tendency of the roller 15 to move irregularly up and down on track 16, on the roller itself which in being resilient is inherently yieldable and is not damaged, and places the strain on the rigid bar 21' without damaging or deranging the drive mechanism or motor.

It should be understood that the present disclosure is for the purpose of illustration only and that this invention includes all modification and equivalents which fall within the scope of the subject matter claimed.

I claim:

1. In a friction drive mechanism for turntables of the kind described having a base, a drive mechanism supporting member pivoted on said base for movement about a vertical axis, and a rigid restraining member overlying the drive mechanism supporting member and fixed at its ends to said base for preventing vertical and angular movement of said member out of a horizontal plane.

2. Friction drive mechanism as set forth in claim 1 and in which said drive mechanism supporting member is formed as a plate pivoted at one side on the base for movement in a plane parallel to the surface of the base, and said rigid restraining member is formed as a bar extending across said plate along a line spaced from the pivotal axis of said plate.

WILLIAM ODENTHAL.

REFERENCES CITED

The following references are of record in the file of this patent:

UNITED STATES PATENTS

| Number | Name | Date |
|---|---|---|
| 506,237 | Kinsman | Oct. 10, 1893 |
| 705,636 | Birnbaum | July 29, 1902 |
| 1,290,712 | Capps | Jan. 7, 1919 |

FOREIGN PATENTS

| Number | Country | Date |
|---|---|---|
| 585,211 | Germany | Sept. 29, 1933 |